(12) United States Patent
Tacken

(10) Patent No.: US 6,238,846 B1
(45) Date of Patent: May 29, 2001

(54) METHOD OF MANUFACTURING A STAMPER SUITABLE FOR PRODUCING OPTICAL DISCS

(75) Inventor: Roland Anthony Tacken, Eindhoven (NL)

(73) Assignee: ODME International B.V., Veldhoven (NL)

( * ) Notice: Subject to any disclaimer, the term of this patent is extended or adjusted under 35 U.S.C. 154(b) by 0 days.

(21) Appl. No.: 09/307,184

(22) Filed: May 7, 1999

(30) Foreign Application Priority Data

May 8, 1998 (NL) .................................. 1009106

(51) Int. Cl.⁷ .................................................. G03C 5/00
(52) U.S. Cl. ............................................ 430/320; 430/321
(58) Field of Search ..................................... 430/315, 320, 430/321

(56) References Cited

U.S. PATENT DOCUMENTS

| | | | |
|---|---|---|---|
| 5,458,985 | * 10/1995 | Isono et al. | 428/601 |
| 5,480,763 | * 1/1996 | Kondo et al. | 430/320 |
| 5,494,782 | 2/1996 | Maenza et al. | |
| 5,573,679 | * 11/1996 | Mitchell et al. | 216/2 |
| 5,699,848 | * 12/1997 | Lee et al. | 164/46 |
| 5,920,037 | * 7/1999 | Jimarez et al. | 174/259 |
| 6,159,664 | * 12/2000 | Huisken et al. | 430/321 |

FOREIGN PATENT DOCUMENTS

| | | |
|---|---|---|
| 667 608 A1 | 8/1995 | (EP) . |
| 816 039 A1 | 1/1998 | (EP) . |
| 99/18572 | 4/1999 | (WO) . |

OTHER PUBLICATIONS

Patent Abstracts of Japan, vol. 017, No. 278 (C–1065), 28 Mei 1993 & JP 05 009775 A (Canon Inc.) 19 Januari 1993.
Patent Abstracts of Japan, vol. 012, No. 104 (P–685), Apr. 6, 1988 & JP 62 236156 A (Seiko Epson Corp), 16 Oktober 1987.

* cited by examiner

*Primary Examiner*—C. H. Kelly
(74) *Attorney, Agent, or Firm*—Pillsbury Winthrop LLP

(57) ABSTRACT

A method of manufacturing a stamper for producing optical discs involves the application of a photoresist film to a substrate and subsequently structuring the photoresist film by exposing and developing the photoresist film. The method is characterized in that an electrically conducting substrate is used. The substrate having the structured photoresist film thereon is subjected to passivation treatment, and is further subject to galvanic treatment for the purpose of forming a nickel layer thereon. After the nickel layer is formed, the nickel layer is separated from the substrate so as to obtain a stamper. The stamper can be used to prepare optical discs.

19 Claims, 1 Drawing Sheet

METHOD OF MANUFACTURING A STAMPER SUITABLE FOR PRODUCING OPTICAL DISCS

BACKGROUND OF THE INVENTION

1. Field of the Invention

The present invention relates to a method of manufacturing a stamper for producing optical discs, which method comprises the application of a photoresist film to a substrate and the subsequent structuring of said photoresist film by exposing and developing said photoresist film. The present invention furthermore relates to a stamper thus obtained and to an optical disc obtained by means of such a stamper.

2. Description of Related Art

A method of this kind is known from Dutch patent application no. 9400225. According to the method of manufacturing a stamper disclosed therein, a stamper plate is subjected to a pre-treatment consisting of a cleaning step and the possible application of a primer for the photoresist to be applied. Then a negative-effect photoresist is coated onto the pre-treated stamper plate, which photoresist is then dried so as to obtain a photoresist film. In a subsequent step, the photoresist film that has been coated onto the stamper plate is selectively exposed to laser light. By selectively exposing the negative-effect photoresist, an acid is formed in the exposed areas, after which a heating step is carried out, as a result of which the photoresist in the exposed areas will be crosslinked whilst catalysis of the acid takes place. Then the selectively exposed, coated photoresist is integrally exposed, as a result of which an acid is formed in the non-exposed areas as well, which acid causes the areas which have not been selectively exposed, and which are not crosslinked, therefore, to dissolve more quickly during the developing step. After said selective exposure, the integrally exposed, coated photoresist film is developed for the purpose of obtaining the structured photoresist film. The exposed areas of a negative photoresist film thus remain after the developing step, whilst non-exposed areas are removed by means of a developing process. Then an additional exposure step in the deep UV range and a heating step at a high temperature (hard bake) are carried out in order to strengthen the exposed and thus crosslinked areas additionally by further crosslinking of polymer chains. A stamper obtained by using such a method comprises a nickel shell provided with photoresist posts. Due to dimensional stability deficiencies of the photoresist posts, stamper thus formed, which is used in the mould of an injection moulding machine for mass-producing CD replicas, has a limited life. Signal measurements in combination with transmission order measurements on the CD replicas thus produced indicate that the post geometries on the stamper had deteriorated to an unacceptable degree after about 5,000 replicas, which has an adverse effect on the signal quality.

SUMMARY OF THE INVENTION

Accordingly, it is an object of the present invention to develop a method of manufacturing a stamper which eliminates the above problems.

According to the present invention, the method as referred to in the introduction is characterized in that an electrically conducting substrate is used, wherein the photoresist film that has been structured onto the substrate is subjected to a passivation treatment, after which the thus passivated substrate, which is provided with a structured photoresist film, is subjected to a galvanic treatment for the purpose of forming a nickel layer thereon, after which the nickel layer thus formed is separated from the substrate so as to obtain the stamper.

Although European patent application No. 0 738 573 discloses a method wherein nickel or nickel alloys are coated onto the structured photoresist layer, it should be understood that such a metallisation layer is necessary in order to be able to use the master in a subsequent galvanic process. Such a metallisation layer enables electrical contact with the master. The master disclosed in said European patent application consists of a non-electrically conducting organic material on glass, which requires an electrically conducting layer, in particular the metallisation layer, for growing the nickel layer in a galvanic process for the purpose of obtaining the mould (a master consisting of nickel). According to the method of the present invention, the application of such a metallisation layer is not necessary and the galvanic treatment can be started directly after a passivation treatment has been carried out, by connecting the present substrate cathodically, wherein the electrical conduction takes place via the nickel.

According to the method of the present invention, it is preferred to use nickel as the electrically conducting substrate. Nickel is the standard stamper material in the injection moulding process. Moreover, nickel possesses good mechanical properties, in particular as regards hardness and dimensional stability, whilst the galvanic process is a quick process.

DETAILED DESCRIPTION OF EMBODIMENTS OF THE INVENTION

Figure 1:
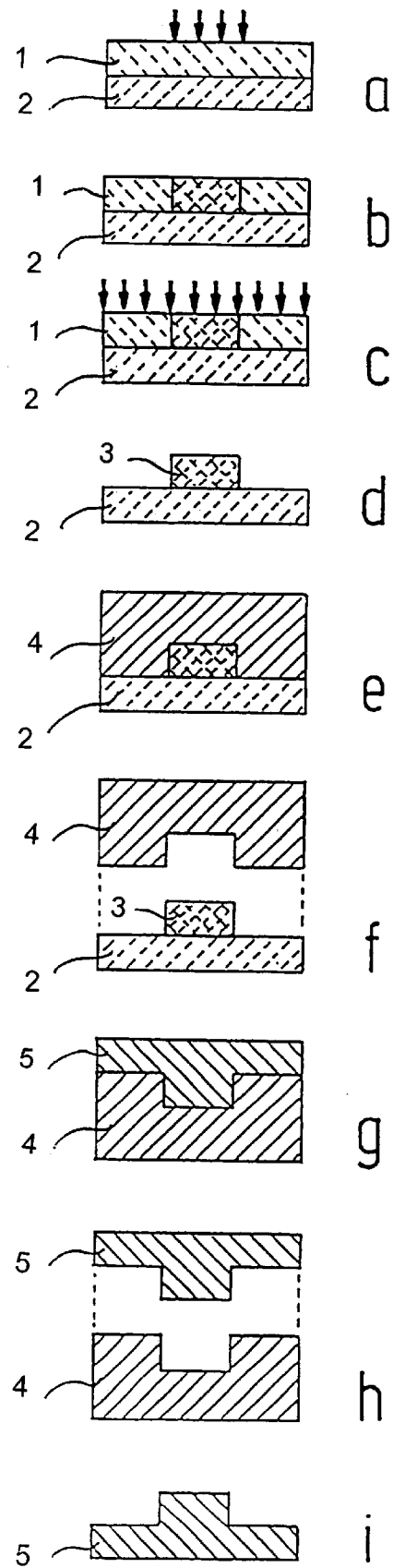
FIG. 1 is a schematic representation of an embodiment of the method of the present invention.

According to a special embodiment of the method according to the present invention, a chemical passivation of the photoresist film that has been structured onto the substrate takes place by immersing the substrate in an oxidizing solution, such as a dichromate, nitrite, nitrate, permangate or benzoate solution, with immersion in a dichromate solution being preferred.

In a special embodiment of the method according to the present invention it is preferred to carry out an anodic passivation treatment. An anodic passivation treatment generally has a certain cleaning effect on the surface, since oxygen gas is formed on the nickel surface. Thus, the anodic passivation treatment must be carried out in a controlled manner, so that the developed oxygen gas is prevented from blowing the photoresist posts off the substrate. This can be accomplished by ensuring that the anodic potential difference with the liquid in which said passivation takes place will remain low, that is, below the normal equilibrium potential for the oxidation potential from water to oxygen.

The photoresist which is used in the method according to the present invention is in particular not critical. When a negative photoresist is exposed to laser light according to the desired pattern of pits, the solubility of the photoresist will be reduced in the exposed places. The non-exposed areas will be dissolved in the subsequent developing process, so that photoresist posts will remain on the substrate. A structure formed in this manner is also called a male parent stamper. After such a structure has been subjected in accordance with the present invention to the above-described chemical or anodic passivation treatment, a nickel layer is coated onto the father stamper by means of a galvanic treatment, after which the nickel layer thus formed is separated from the substrate so as to obtain a completely nickel mother stamper. The mother stamper thus obtained is suitable for being used in a usual galvanic treatment for forming so-called sons. In certain embodiments, however, it is desirable for the photoresist material which is still present in the pits of the mother stamper to be removed first, after which a usual galvanic process for forming so-called sons is carried out. Such sons, which have an inverted structure compared to the mother stamper, are suitable for being used in a usual replication process. When the family process is started from a father stamper, one step less is required in the galvanic process in order to obtain the desired sons. An embodiment of this kind thus leads to a shorter time of passage, which is desirable in practice. In certain embodiments it is on the other hand preferred to use a positive photoresist. The positive photoresist is exposed to laser light according to the desired pattern of pits, after which the exposed places are dissolved in the subsequent developing process. Thus, a substrate provided with a photoresist film comprising pits is obtained. The pits have a depth which corresponds with the thickness of the positive photoresist film. According to the invention, the master or mother plate thus obtained is then subjected to an anodic or chemical passivation treatment, after which the nickel layer grows onto the master in a galvanic treatment. A nickel layer will grow from the pits of the positive photoresist film and from the mirror images, which are also exposed so as to obtain the largest possible nickel contact surface in the subsequent galvanic step, which nickel layer will eventually cover the photoresist film as well. After separation of the nickel layer thus formed from the substrate, the father stamper is obtained. Mothers and sons can be obtained via a usual galvanic process, which mothers have an inverted structure compared to the father stamper, whilst the sons are identical to the father. It is also possible, however, to use a positive photoresist, using the image reversal process. According to such a method, the photoresist is coated onto the electrically conducting substrate, which photoresist is exposed to laser light according to the desired pattern of pits. Then the photoresist-coated substrate is heated, whereby a chemical reaction is developed in the exposed areas, which results in poor solubility of the photoresist. Upon subsequent integral exposure of the photoresist, the areas not exposed to the laser light are made soluble, after which the integrally exposed areas, with the exception of the areas selectively exposed to laser light, are dissolved in the subsequent developing process. Thus photoresist posts will remain on the substrate, which substrate is a father stamper. Then the same processes as described above are according to the invention carried out with the negative photoresist, thus obtaining a mother stamper which is completely made of nickel.

In the embodiment wherein a negative or a negative-effect photoresist and a CD format information area is used, about 15% of the surface of the stamper obtained by using the method according to the present invention is generally covered with photoresist posts. In order to form a nickel layer thereon, it is therefore preferred to carry out the galvanic treatment according to special method. In order to obtain complete growth of the nickel layer round the photoresist posts, which is important, especially on the upper side of the photoresist posts, it is desirable that initially the growth of the nickel layer takes place slowly. Experiments have shown that too high a deposition rate prevents the nickel from growing completely round the photoresist posts, which will result in a mother stamper possessing a geometry which deviates from that of the father stamper, which is undesirable in practice. Another aspect which occurs in the galvanic treatment is the development of hydrogen gas. If the deposition rate of nickel is high, hydrogen gas will be formed to a substantial degree, as a result of which the photoresist posts will be blown off the substrate. Moreover, in the embodiment wherein the electrically conducting substrate is made of nickel, the nickel ions can diffuse through the photoresist film, as a result of which nickel in the photoresist posts can be reduced. Such a phenomenon may lead to nickel growth through the photoresist film, as a result of which the geometry of the desired mother stamper will not correspond with that of the original father stamper. In the present invention it is therefore preferred to carry out the galvanic treatment for forming the nickel layer in one or more steps. In particular, the current density (current per unit area) is gradually raised from an initial value to a final value in a first step. Thus the above-mentioned drawbacks, in particular the insufficient growth of nickel round the photoresist posts and the quick development of hydrogen gas, are prevented from manifesting themselves. Preferably, the current density of the final value of the first step is then further increased to the final value of the subsequent step, after which the final value thus reached may be maintained for a particular period of time so as to obtain the desired thickness of the nickel layer. The present galvanic treatment in particular comprises three steps for forming the nickel layer, viz. a first step with an increase of the current density from 0 to a relatively low value, for example 30–100 $Am^{-2}$, followed by a second step with an increase of the current density to a higher value, for example 2000–3000 $Am^{-2}$, after which the current density is maintained at a constant level until the desired thickness of the nickel layer is reached. The first step is carried out during a period wherein the pits are not completely filled with nickel yet. Experiments have shown that a period of about 2 minutes is sufficient. In the second step, a considerable increase of the current density takes place in order to have the nickel deposition take place as quickly as possible. It should be understood that a nickel layer of insufficient thickness is not suitable in practice, because the mechanical stability of the desired nickel shell will be insufficient. It is also possible, however, to carry out the galvanic treatment for forming the nickel layer in one step at a low current density, but such an embodiment is not preferred in practice from the viewpoint of production rate.

In certain embodiments it is desirable to subject the stamper obtained by separating the substrate from the galvanically formed nickel layer to a treatment for removing residual photoresist film. Such residual photoresist film fills the pits of the nickel stamper and must be removed before a galvanic process is carried out for obtaining replicas. The treatment for removing residual photoresist film comprises rinsing with an alkaline solution, preferably a developer solution or Isoprep. In certain embodiments it is preferred to remove such residual photoresist film by means of a UV-ozone process. In certain embodiments it is desirable, however, to use a combination of rinsing with an alkaline solution and carrying out a UV-ozone process for removing residual photoresist film.

In certain embodiments, the nickel stamper obtained by using the method according to the present invention is subjected to a galvanic replication process with a view to obtaining a stamper which has an inverted structure compared to the original stamper. If a mother stamper is obtained by means of the method according to the present invention, a son stamper which is suitable for use in the replication process will be obtained by carrying out a usual galvanic process. If on the other hand a father stamper is directly obtained by means of the method according to the present invention, it is possible to use the father stamper thus obtained in the replication process. Thus, the present invention furthermore relates to a method of producing optical discs, which method is characterized in that a stamper obtained by means of the method according to the present invention is used. The present invention furthermore relates to a stamper for producing optical discs, which stamper is characterized in that it has been obtained by using the method according to the present invention. In addition to that, the present invention relates to optical discs, which optical discs are characterized in that they have been obtained by using the present method.

The present invention will be explained hereafter by means of examples and a drawing, wherein FIG. 1 schematically illustrates the method according to the present invention, whereby it should be understood, however, that the present invention is by no means limited to such special examples.

FIG. 1 schematically shows the method according to the present invention. An electrically conducting material 2, in particular a nickel mirror, is provided with a light sensitive photoresist 1. In step a, selective exposure of photoresist 1 takes place and the information pattern is thus written. Then the whole is subjected to a so-called reversal bake in step b, after which a complete exposure of the photoresist takes place in step c. The completely exposed photoresist is developed in step d, as a result of which an electrically conducting substrate 2 provided with photoresist posts 3 is obtained. The photoresist film 3 that has been structured onto substrate 2 is then subjected to a passivation treatment, after which the thus passivated substrate 2, which is provided with a structured photoresist film 3, is subjected to a galvanic treatment in step e so as to form a nickel layer 4 thereon. Then the assembly obtained in step e is separated in step f so as to obtain the stamper 4. In step g, the stamper 4 obtained in step f then undergoes further processing, using a usual galvanic treatment, so as to obtain father stamper 5. Finally, in step h, father stamper 5 is separated from mother stamper 4. Thus, a father stamper is obtained in step i.

EXAMPLE 1

Use of a Negative Photoresist

A nickel mirror having a thickness of 295 μm and a radius of 100 mm is treated with an adhesive ("primer"), that is, rinsed with a solution of 1% by vol. of N-2 aminoethyl 3-aminopropyl trimethoxysilane in water. This is followed by rinsing with water. Negative photoresist ma-N405 (marketed by Micro Allresist) is spin-coated onto the mirror in a 20% (w/w) solution. The mirror with the photoresist (=substrate) is heated on a hot plate (so-called pre-bake). The substrate is selectively exposed by means of a modulated laser, for example in an ODME AMS laser beam recorder. The laser which is used has a wavelength of 413 nm and the dose is about 20 J cm$^{-2}$. In this manner the information pattern is written. The substrate is then heated on a hot plate (so-called post-exposure bake). The pattern of pits is developed by metering a solution of 0.6% (w/w) NaOH in the water onto the rotating substrate. The developing process is monitored by following the diffraction of laser light (wavelength: 638 nm) on the pattern of pits being formed. During the developing process, a maximum is observed. After this maximum, the developing process is stopped, that is, at the moment the amplitude of the first order diffraction signal is still a predetermined percentage of the maximum observed during the developing process. Then rinsing with water and drying takes place. The developed substrate that is obtained is subjected to a chemical passivation treatment, wherein the substrate is immersed in a solution of 1.5 g/l $K_2Cr_2O_7$. Then rinsing with water takes place. The substrate is connected cathodically in a galvanic bath of the following composition:

| Parameter | Value |
| --- | --- |
| $Ni(NH_2SO_3)_2 \cdot 4\ H_2O$ | 500 g/l |
| $H_3BO_3$ | 45 g/l |
| SNAP AM (wetting agent) | 0.1% by vol. |
| pH | 4.0 |
| Temperature | 55° C. |

The following current density was used:

| Time | Current density ($Am^{-2}$) |
| --- | --- |
| 0–120 seconds | linear increase of current from 0 to 2 $Am^{-2}$ |
| 120–240 seconds | linear increase from 2 to 90 $Am^{-2}$ |
| 240–3400 seconds | constant at 90 $Am^{-2}$ |

The galvanically deposited nickel mother shell is separated from the substrate. The residual photoresist film present in the mother pits is removed by means of 100 g/l NaOH, followed by immersion in a bath with an Isoprep solution. Then a son stamper of the mother is grown, wherein the mother is first passivated as described before.

EXAMPLE 2

Use of an Image Reversal photoresist

A nickel mirror having a thickness of 295 μm and a radius of 100 mm is treated with an adhesive ("primer"), that is, rinsed with a solution of 1% by vol. of N-2 aminoethyl 3-aminopropyl trimethoxysilane in water, viz. undiluted Surpass 2000 (marketed by Dischem Inc.). This is followed by rinsing with water. Image reversal photoresist AZ5214E (marketed by Hoechst) is spin-coated onto the mirror in a 20% (w/w) solution in a solvent PMA. The mirror with the photoresist (=substrate) is heated on a hot plate (so-called pre-bake). The substrate is selectively exposed by means of a modulated laser, for example in an ODME AMS laser beam recorder. The laser which is used has a wavelength of 413 nm and a dose of about 5 mJ cm$^{-2}$ is used. In this manner the information pattern is written. The substrate is then heated on a hot plate (so-called reversal bake). After cooling, the substrate is exposed to 380 nm UV light. The lamp type which is used is Philips PL-S 9W (×2). The pattern of pits is developed by metering a solution of 10 g/l KOH in water onto the rotating substrate. The developing process is monitored by following the diffraction of laser light (wavelength: 638 nm) on the pattern of pits being formed. During the developing process, a maximum is observed. After this maximum, the developing process is stopped, that is, at the moment the amplitude of the first order diffraction signal is still a predetermined percentage of the maximum observed during the developing process. Then rinsing with water and drying takes place. The developed substrate that is obtained is subjected to a chemical passivation treatment, which treatment is carried out by immersing the developed substrate in a solution of 1.5 g/l $K_2Cr_2O_7$. Then rinsing with water takes place. The substrate is connected cathodically in a galvanic bath of the following composition/parameters:

| Parameter | Value |
|---|---|
| Ni(NH$_2$SO$_3$)$_2$.4 H$_2$O | 500 g/l |
| H$_3$BO$_3$ | 45 g/l |
| SNAP AM (wetting agent) | 0.1% by vol. |
| pH | 4.0 |
| Temperature | 55° C. |

The following current density was used:

| Time | Current density (Am$^{-2}$) |
|---|---|
| 0–120 seconds | linear increase current from 0 to 2 Am$^{-2}$ |
| 120–240 seconds | linear increase from 2 to 90 Am$^{-2}$ |
| 240–3400 seconds | constant at 90 Am$^{-2}$ |

The galvanically deposited nickel mother shell is separated from the substrate. The residual photoresist film present in the mother pits is removed by means of 100 g/l NaOH, followed by immersion in a bath with an Isoprep solution. A son stamper of the mother is grown, wherein the mother is first subjected to a passivation process as described before.

EXAMPLE 2

Use of a Positive Photoresist

A nickel mirror having a thickness of 295 μm and a radius of 100 mm is treated with an adhesive ("primer"), that is, rinsed with a solution of 1% by vol. of N-2 aminoethyl 3-aminopropyl trimethoxysilane in water. This is followed by rinsing with water. A positive photoresist Shipley S1805 is spin-coated onto the mirror in a 20% (w/w) solution. The mirror with the photoresist (=substrate) is heated in a hot air oven (so-called pre-bake). The substrate is selectively exposed by means of a modulated laser, for example an ODME AMS laser beam recorder. The laser which is used has a wavelength of 413 nm and a dose of about 5 mJ cm$^{-2}$ is used. In this manner the information pattern is written. The inner and outer mirror areas are also exposed. The pattern of pits is developed by metering a solution of 2.5 g/l of NaOH in water onto the rotating substrate. The developing process is monitored by following the diffraction of laser light (wavelength: 638 nm) on the pattern of pits being formed. The developing process is stopped when the amplitude of the first order diffraction signal is still a predetermined percentage of that of the zero order diffraction signal. Then rinsing with water and drying takes place. The developed substrate that is obtained is immersed in a solution of 1.5 g/l K$_2$Cr$_2$O$_7$. The nickel is passivated in this manner. Then rinsing with water takes place. The substrate is connected cathodically in a galvanic bath of the following composition/parameters:

| Parameter | Value |
|---|---|
| Ni(NH$_2$SO$_3$)$_2$.4 H$_2$O | 500 g/l |
| H$_3$BO$_3$ | 45 g/l |
| SNAP AM (wetting agent) | 0.1% by vol. |
| pH | 4.0 |
| Temperature | 55° C. |

The following current density was used:

| Time | Current density (Am$^{-2}$) |
|---|---|
| 0–120 seconds | linear increase current from 0 to 2 Am$^{-2}$ |
| 120–240 seconds | linear increase from 2 to 90 Am$^{-2}$ |
| 240–3400 seconds | constant at 90 Am$^{-2}$ |

The galvanically deposited nickel mother shell is separated from the substrate. The residual photoresist film present in the pits is removed by means of 100 g/l NaOH, followed by immersion in a bath with an Isoprep solution. The stamper can directly be used in the injection moulding process. In addition, mother and sons can be grown according to a usual galvanic process.

What is claimed is:

1. A method of manufacturing a stamper for producing optical discs, said method comprising:
    applying a photoresist film to an electrically conducting substrate;
    structuring the photoresist film applied to the substrate, said structuring of the photoresist film comprising exposing and developing the photoresist film;
    subjecting the substrate provided with the structured photoresist film thereon to passivation treatment in order to passivate the substrate;
    subjecting the passivated substrate provided with the structured photoresist film thereon to galvanic treatment to form a nickel layer thereon; and
    separating the nickel layer from the passivated substrate provided with the structured photoresist film so as to obtain the stamper.

2. A method according to claim 1, wherein the electrically conducting substrate comprises nickel.

3. A method according to claim 1, wherein the passivation treatment comprises a chemical passivation treatment, and wherein said method further comprises immersing the structured photoresist film in an oxidizing solution.

4. A method according to claim 3, wherein the oxidizing solution comprises a member selected from the group consisting of a dichromate, nitrite, nitrate, permangate, and benzoate solution.

5. A method according to claim 4, wherein the oxidizing solution comprises the dichromate solution.

6. A method according to claim 1, wherein the passivation treatment comprises an anodic passivation treatment.

7. A method according to claim 6, wherein the passivation treatment takes place in a liquid having an anodic potential difference that is lower than the normal equilibrium potential at which oxygen is developed.

8. A method according to claim 1, wherein the photoresist film comprises a negative or negative-effect photoresist.

9. A method according to claim 1, wherein the photoresist film comprises a positive photoresist.

10. A method according to claim 9, wherein said exposing of the photoresist film comprises forming pits and mirror images in the photoresist film.

11. A method according to claim 1, wherein the galvanic treatment comprises one or more steps.

12. A method according to claim 1, wherein the galvanic treatment comprises a plurality of steps, the first step of which comprises gradually increasing the current density from an initial value to a final value.

13. A method according to claim 12, wherein subsequent to the first step, the current density is gradually increased from the final value of the first step to a final value of the galvanic treatment.

14. A method according to claim 13, wherein the galvanic treatment comprises maintaining the current density at the final value of the galvanic treatment for a period of time.

15. A method according to claim 1, wherein subsequent to said separating of the nickel layer from the passivated substrate, said method further comprises removing residue of the structured photoresist film.

16. A method according to claim 15, wherein said removing of the residue of the structured photoresist film comprises rinsing with an alkaline solution.

17. A method according to claim 15, wherein said removing of the residue of the structured photoresist film comprises a UV-ozone treatment.

18. A method according to claim 15, wherein said removing of the residue of the structured photoresist film comprises subjecting the residue to alkaline solution and UV-ozone treatment.

19. A method according to claim 1, further comprising subjecting the stamper, which is a first stamper, to a galvanic replication process to obtain a second stamper having an inverted structure compared to the first stamper.

* * * * *